United States Patent Office 3,081,300
Patented Mar. 12, 1963

3,081,300
18-NOR-CORTISONE INTERMEDIATES AND PREPARATION THEREOF
Gaston Amiard, Noisy le Sec, René Heymes, Romainville, and Truong Van Thuong, Clichy-sur-Bois, France, assignors to Roussel-UCLAF, S.A., Paris, France, a corporation of France
No Drawing. Filed May 18, 1962, Ser. No. 196,010
Claims priority, application France May 24, 1961
11 Claims. (Cl. 260—239.55)

The present invention relates to a novel process for the preparation of 18-nor-pregnane-17α-ol-3,11,20-trione which is an intermediate for the preparation of 18-nor-cortisone and its esters. The invention also relates to novel intermediates.

In United States Patent No. 3,005,816 there is described a process for the preparation of 18-nor-cortisone and its carboxylic acid esters. The process consists of reacting the 3-ethylene ketal of 18-nor-Δ16-pregnene-3,11,20-trione with hydrogen peroxide to form the corresponding 16,17-epoxy compound, reacting the latter with hydrogen bromide to form the corresponding 16-bromo-17α-hydroxy compound which is used to prepare 18-nor-cortisone. However, during recent circular dichroism studies of the products of the said process, it has been shown that due to the absence of the angular methyl group in the 13-position the products formed are not 17α-hydroxylated compounds but are 17β-hydroxylated steroids whose lateral chain is in the α-position. Therefore, 18-nor-cortisone was not produced but merely a stereoisomer thereof.

It is an object of the invention to provide a novel process for the preparation of 18-nor-pregnane-17α-ol-3,11,20-trione which is an intermediate or 18-nor-cortisone.

It is another object of the invention to provide novel intermediates for the preparation of 18-nor-pregnane-17α-ol-3,11,20-trione, namely:

(a) The 3-lower alkylene ketals of 18-nor-pregnane-3,11,20-trione,
(b) The 3-lower alkylene ketals of 17α-hydroperoxy-18-nor-pregnane-3,11,20-trione,
(c) The 3-lower alkylene ketals of 18-nor-pregnane-17α-ol-3,11,20-trione.

These and other objects and advantages of the invention will become obvious from the following detailed description.

The process of the invention comprises catalytically hydrogenating a 3-lower alkylene ketal of 18-nor-Δ16-pregnene-3,11,20-trione, preferably in the presence of a palladium catalyst, to form a 3-lower alkylene ketal of 18-nor-pregnane-3,11,20-trione, oxidizing the latter with oxygen to form a 3-lower alkylene ketal of 17α-hydroperoxy-18-nor-pregnane-3,11,20-trione, reducing the latter to form a 3-lower alkylene ketal of 18-nor-pregnane-17α-ol-3,11,20-trione, hydrolyzing the latter under acidic conditions to form 18-nor-pregnane-17α-ol-3,11,20-trione and recovering the latter.

A preferred mode of the process comprises catalytically hydrogenating the 3-ethylene ketal of 18-nor-Δ16-pregnene-3,11,20-trione in the presence of a palladium chloride catalyst to form 18-nor-pregnane-3,11,20-trione, oxidizing the latter with oxygen in the presence of an alkali metal ter-butylate such as potassium butylate to form the 3-ethylene ketal of 17α-hydroperoxy-18-nor-pregnane-3,11,20-trione, reducing the latter with zinc and acetic acid to form the 3-ethylene ketal of 18-nor-pregnene-17α-ol-3,11,20-trione, hydrolyzing the latter in the presence of an acid such as aqueous acetic acid to form 18-nor-pregnane-17α-ol-3,11,20-trione and recovering the latter. The reaction scheme is illustrated in Table I.

TABLE I

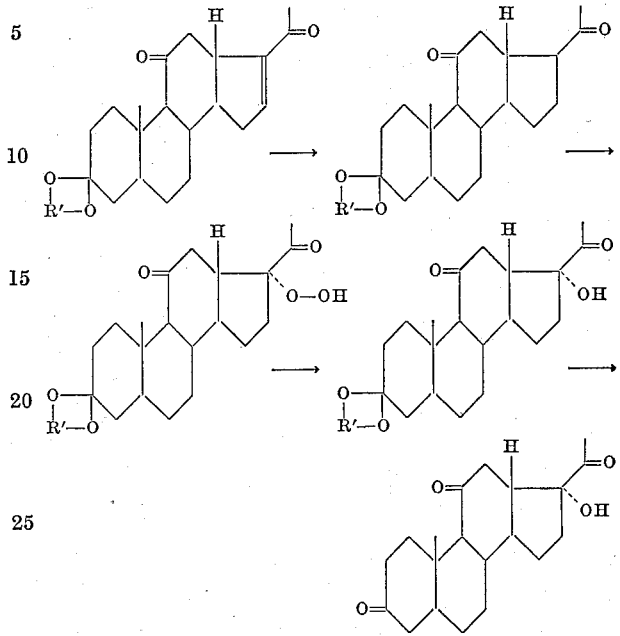

wherein R' is a lower alkylene radical.

18-nor-cortisone may be prepared by brominating 18-nor-pregnane-17α-ol-3,11,20-trione with bromine to form 4-bromo-18-nor-pregnane-17α-ol-3,11,20-trione, dehydrobrominating the latter in the presence of a mixture of lithium carbonate and lithium bromide in dimethylformamide to form 18-nor-Δ4-pregnene-17α-ol-3,11,20-trione, introducing a hydroxyl group in the 21-position of the latter by chemical or microbiological means to form 18-nor-cortisone and recovering the latter. The corresponding 21-esters of 18-nor-cortisone can be prepared by reaction with an acylating agent such as an acid chloride or an acid anhydride. The reaction scheme is illustrated in Table II.

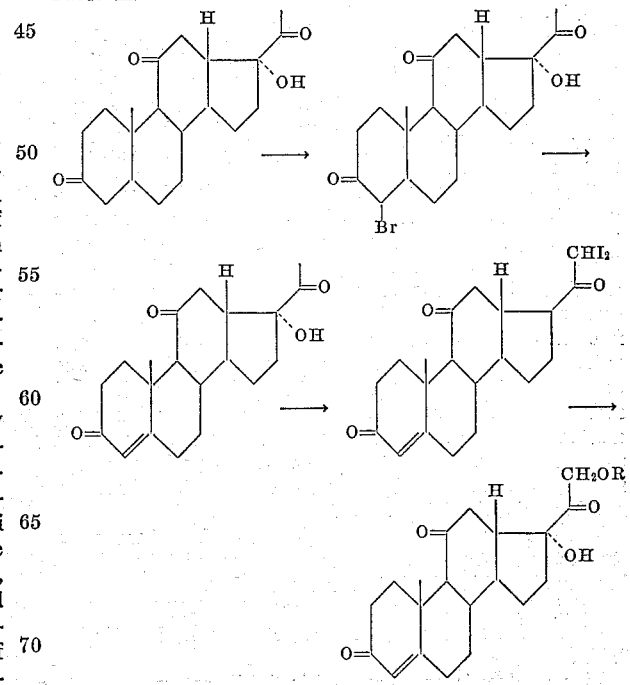

wherein R is selected from the group consisting of hydrogen and an acyl radical of an organic carboxylic acid having 1 to 18 carbon atoms.

18-nor-cortisone and its carboxylic acid esters have useful physiological activities and particularly have an excellent anti-inflammatory and antiasthmatic activity.

In the following examples there are described several preferred embodiments to illustrate the invention. However, it should be understood that the invention is not intended to be limited to the specific embodiments.

EXAMPLE I

*Preparation of 18-Nor-Pregnane-17α-ol-3,11,20-Trione*

*Step A—Preparation of the 3-ethylene ketal of 18-nor-pregnane-3,11,20-trione.*—2 gm. of active carbon were introduced into 100 cc. of water. 8 cc. of an aqueous solution containing 2% of palladium chloride were added and the mixture was hydrogenated until no more absorption of hydrogen occurred. The mixture was vacuum filtered, washed with water and then with alcohol.

The catalyst thus prepared was added to a solution of 14.8 gm. of the 3-ethylene ketal of 18-nor-$\Delta^{16}$-pregnene-3,11,20-trione (obtained according to Velluz et al., Compt. Rend. Ac. Sci., 250, 371–373, 1960), in 150 cc. of tetrahydrofuran, containing several drops of pyridine. The mixture was agitated in an atmosphere of hydrogen, for a period of 40 minutes. The catalyst was vacuum filtered therefrom and the filtrate was evaporated to dryness under vacuum. 14.2 gm. of the 3-ethylene ketal of 18-nor-pregnane-3,11,20-trione were obtained, having a melting point of 180° C., and a specific rotation $[\alpha]_D^{20}=+63\pm2°$ (c=1% in chloroform).

The product occurred in the form of colorless short rods. It was very soluble in chloroform, soluble in acetone, slightly soluble in alcohol and ether and insoluble in water.

*Analysis.*—$C_{22}H_{32}O_4$: Molecular weight=360.48. Calculated: C, 73.30%; H, 8.95%. Found: C, 73.2%; H, 8.9%.

This compound is not described in the literature.

*Step B—Preparation of the 3-ethylene ketal of 17α-hydroperoxy-18-nor-pregnane-3,11,20-trione.*—5 gm. of freshly scraped potassium were dissolved in 200 cc. of t-butanol at the reflux temperature under an atmosphere of nitrogen. The solution was cooled to room temperature and 50 cc. of benzene were added thereto. The solution thus prepared was mixed with a solution of 10 gm. of the 3-ethylene ketal of 18-nor-pregnane-3,11,20-trione in 150 cc. of benzene. The mixture was cooled to −7° C. for several minutes and then agitated under an atmosphere of oxygen for a period of 45 minutes. A clear yellow solution of the 3-ethylene ketal of 17α-hydroperoxy-18-nor-pregnane-3,11,20-trione was obtained, which was directly reduced without isolating it.

*Step C—Preparation of 3-ethylene ketal of 18-nor-pregnane-17α-ol-3,11,20-trione.*—30 gm. of zinc in powder form were added to the yellow solution prepared in step B and then slowly 90 cc. of acetic acid were added. The reaction mixture was allowed to stand at room temperature for a period of one hour. Then the zinc was vacuum filtered therefrom and the filtrate was reduced to a small volume. 200 cc. of water were added. The t-butanol was removed and the acid was neutralized by the addition of sodium hydroxide solution. The aqueous mixture was extracted with ether. The ethereal extracts were evaporated to dryness under vacuum and the 3-ethylene ketal of 18-nor-pregnane-17α-ol-3,11,20-trione was obtained having a melting point of 180° C.

The product occurred as colorless crystals and was very soluble in chloroform, soluble in acetone, slightly soluble in alcohol, and insoluble in water and ether.

*Analysis.*—$C_{22}H_{32}O_5$: Molecular weight=376.48. Calculated: C, 70.18%; H, 8.57%. Found: C, 70.0%; H, 8.5%.

This product is not described in the literature.

*Step D—Preparation of 18-nor-pregnane-17α-ol-3,11, 20-trione.*—The 3-ethylene ketal of 18-nor-pregnane-17α-ol-3,11,20-trione obtained in Step C was introduced into 20 cc. of acetic acid containing 50% of water and was heated in a water bath for a period of 30 minutes. The solution was cooled, 100 cc. of water were added, and the aqueous solution was extracted with methylene chloride. The extracts were washed with water, with an aqueous solution containing 10% of sodium bicarbonate, dried, concentrated under vacuum to a small volume, and 40 cc. of ether were added thereto. 18-nor-pregnane-17α-ol-3,11,20-trione crystallized therefrom. It was vacuum filtered and the product melting at 208–210° C. and having a specific rotation $[\alpha]_D^{20}=+40°\pm2°$ (c.=1% in chloroform) was obtained.

The product occurred in the form of colorless leaflets, and was very soluble in chloroform, soluble in acetone, slightly soluble in alcohol, and insoluble in water and ether.

*Analysis.*—$C_{20}H_{28}O_4$: Molecular weight=332.42. Calculated: C, 72.26%; H, 8.49%. Found: C, 72.5%; H, 8.5%.

This compound is not described in the literature.

EXAMPLE II

*Preparation of 18-Nor-Cortisone and its Acetate*

*Step A—Preparation of 4-bromo-18-nor-pregnane-17α-ol-3,11,20-trione.*—5.3 gm. of 18-nor-pregnane-17α-ol-3,11,20-trione were dissolved in 120 cc. of chloroform. 15 cc. of acetic acid were added and the solution was cooled to −60° C. while operating in an atmosphere of nitrogen. A solution of 7.3 gm. of hydrobromic acid, 14.46 gm. of bromine and 70 cc. of acetic acid was added and the reaction mixture was agitated for a period of 30 minutes. Next, 4.25 gm. of sodium acetate dissolved in 18 cc. of water were introduced. The aqueous layers were separated and the organic layer was washed with water and then with an aqueous solution containing 10% sodium bicarbonate. The brominated derivative, 4-bromo-18-nor-pregnane-17α-ol-3,11,20-trione, crystallized and was vacuum filtered. It was dried and the product obtained was used without further purification for the rest of the synthesis.

This product is not described in the literature.

*Step B—Preparation of 18-nor-$\Delta^4$-pregnene-17α-ol-3, 11,20-trione.*—2.5 gm. of lithium bromide were dissolved in 50 cc. of dimethylformamide. 1.25 gm. of lithium carbonate and 5 gm. of the 4-brominated derivative prepared in Step A were added thereto. The reaction mixture was heated while agitating it in an atmosphere of nitrogen for a period of 25 minutes at 135° C. After cooling, the mixture was poured into water containing 1% of acetic acid and agitated. Thereafter, the mixture was decanted and the aqueous solution extracted with methylene chloride. The extracts were concentrated to a small volume and added to ether. 18-nor-$\Delta^4$-pregnene-17α-ol-3,11,20-trione precipitated. After it was vacuum filtered and recrystallized in chloroform, the product had a melting point of 220° C. and a specific rotation $[\alpha]_D^{20}=+175°\pm2°$ (c.=1% in chloroform).

The product occurred in the form of colorless prismatic crystals and was soluble in chloroform, slightly soluble in acetone and alcohol, and insoluble in ether and water.

*Analysis.*—$C_{20}H_{26}O_4$: Molecular weight=330.41. Calculated: C, 72.70%; H, 7.93%. Found: C, 72.7%; H, 7.8%.

This compound is not described in the literature.

*Step C—Preparation of 21-diiodo-18-nor-$\Delta^4$-pregnene-17α-ol-3,11,20-trione.*—23 cc. of anhydrous methanol, 7 cc. of methanol containing 10% calcium chloride and 2.3 gm. of quicklime were added to 2.3 gm. of 18-nor-$\Delta^4$-pregnene-17α-ol-3,11,20-trione. The solution was cooled and 3.6 gm. of iodine were added thereto. The mixture thus formed was agitated in a closed vessel for a period of about two and one half hours and then was filtered. A solution of the 21-iodated derivative, 21-diiodo-18-nor-$\Delta^4$-pregnene-17α-ol-3,11,20-trione, was obtained which was directly utilizable for the rest of the synthesis.

This product is not described in the literature.

*Step D—Preparation of the 21-acetate of 18-nor-cortisone.*—A suspension of 9.2 gm. of potassium acetate in 70 cc. of acetone and 1.2 cc. of acetic acid was added to the solution of the 21-iodated derivative obtained in Step C. The mixture was heated to reflux in an atmosphere of nitrogen for a period of an hour and a half and then was poured into water. The solvents were removed under vacuum and the product formed was vacuum filtered. After dissolution in acetic acetone, treatment with zinc, then with animal carbon black, a product melting at 222° C. and a specific rotation $[\alpha]_D^{20} = +106° \pm 2°$ (c.=1% in chloroform) was obtained consisting of the acetate of 18-nor-cortisone.

It occurred in the form of colorless prismatic crystals, very soluble in chloroform, slightly soluble in alcohol, acetone, very slightly soluble in ether and insoluble in water.

*Analysis.* — $C_{22}H_{28}O_6$: Molecular weight=388.44. Calculated: C, 68.02%; H, 7.27%. Found: C, 68.0%; H, 7.1%.

This compound is not described in the literature.

By saponification with the aid of aqueous potassium hydroxide, 18-nor cortisone was obtained in the form of its free alcohol which could be changed by the action of an acid chloride, such as pivalic acid chloride, cyclopentyl acetic acid chloride, benzoic acid chloride, hexahydrobenzoic acid chloride, etc., into the corresponding esters of 18-nor cortisone.

EXAMPLE III

Introduction of the hydroxyl in the 21-position can also be realized by microbiological methods, for example, in the following fashion.

*Colletotrichum lindemuthianum* (ATCC 12611) was cultivated for a period of 10 days at 24° C. on a gelatin media based on 2% of saccharose and 20% of potato-steeped liquor. The conidia were collected in distilled water. The suspension obtained was used to sterilely inoculate an Erlenmeyer flask of 1 liter containing 100 cc. of a media composed as follows:

| | Gm. |
|---|---|
| Pure glucose | 10 |
| Malt extract | 5 |
| Soybean flour | 10 |
| Sodium chloride | 5 |
| Dry corn steep | 5 |
| Calcium carbonate | 1 |
| Tap water sufficient to make 1000 cc. | |

The pH of this media was previously adjusted to 6.8–7.0 by potassium hydroxide and was sterilized by heating for 30 minutes at a temperature of 120° C.

After 5 days of culturing at 24° C. in a shaking apparatus (85 strokes per minutes, length: 8 cm.), 10 cc. of an acetonic solution containing 1% of 18-nor-$\Delta^4$-pregnene-17α-ol-3,11,20-trione were added to 1000 cc. of culture. A new incubation of 24 hours gave 18-nor-cortisone as determined by paper chromatographic tests which could be effected as follows on 50 cc. of culture broth.

The broth was filtered and the mycellium was washed twice with 5 cc. of acetone which was added to the filtrate. The mycellium was then extracted twice with 50 cc. of chloroform and the preceding filtrate was extracted with these 100 cc. of chloroform. Then the filtrate was extracted twice more using 20 cc. of chloroform each time. The chloroform extracts were combined and washed first with an aqueous solution of sodium carbonate and then with water. They were dried over magnesium sulfate and evaporated to dryness under vacuum.

The residue was taken up in 1 cc. of methanol and subjected to paper chromatography. After the chromatography the sheet was immersed in a 30% solution of propylene glycol. After allowing it to drip, the chromatography was effected by utilizing for the steroid a toluene saturated with propylene glycol with a development of 8 to 15 hours. The preparation of the spots was made by the color reaction of Mader and Buck (Anal. Chem., 1952, 24, 666) with triphenyl tetrazolium chloride which gives a red coloration on white background with the steroids possessing the ketol function R—CO—CH$_2$OH.

Various modifications of the process may be made without departing from the spirit or scope of the invention and it is to be understood that the invention is to be limited only as defined in the appended claims.

We claim:

1. 3-lower alkylene ketals of 18-nor-pregnane-3,11,20-trione.

2. The 3-ethylene ketal of 18-nor-pregnane-3,11,20-trione.

3. The 3-lower alkylene ketals of 17α-hydroperoxy-18-nor-pregnane-3,11,20-trione.

4. The 3-ethylene ketal of 17α-hydroperoxy-18-nor-pregnane-3,11,20-trione.

5. 3-lower alkylene ketals of 18-nor-pregnane-17α-ol-3,11,20-trione.

6. The 3-ethylene ketal of 18-nor-pregnane-17α-ol-3,11,20-trione.

7. A process for the preparation of 18-nor-pregnane-17α-ol-3,11,20-trione which comprises catalytically hydrogenating a 3-lower alkylene ketal of 18-nor-$\Delta^{16}$-pregnene-3,11,20-trione to form a 3-lower alkylene ketal of 18-nor-pregnane-3,11,20-trione, oxidizing the latter to form a 3-lower alkylene ketal of 17α-hydroperoxy-18-nor-pregnane-3,11,20-trione, reducing the latter to form a 3-lower alkylene ketal of 18-nor-pregnane-17α-ol-3,11,20-trione, hydrolyzing the latter under acidic conditions to form 18-nor-pregnane-17α-ol-3,11,20-trione and recovering the latter.

8. The process of claim 7 wherein the hydrogenation is effected in the presence of a palladium catalyst.

9. The process of claim 7 wherein the oxidation is effected with oxygen in the presence of an alkali metal t-butylate.

10. The process of claim 7 wherein the reduction is effected with zinc and acetic acid.

11. A process for the preparation of 18-nor-pregnane-17α-ol-3,11,20-trione which comprises catalytically hydrogenating the 3-ethylene ketal of 18-nor-$\Delta^{16}$-pregnene-3,11,20-trione in the presence of a palladium chloride catalyst to form the 3-ethylene ketal of 18-nor-pregnane-3,11,20-trione, oxidizing the latter with oxygen in the presence of potassium t-butylate to form the 3-ethylene ketal of 17α-hydroperoxy-18-nor-pregnane-3,11,20-trione, reducing the latter with zinc and acetic acid to form the 3-ethylene ketal of 18-nor-pregnane-17α-ol-3,11,20-trione, hydrolyzing the latter with an aqueous acid to form 18-nor-pregnane-17α-ol-3,11,20-trione and recovering the latter.

References Cited in the file of this patent

UNITED STATES PATENTS 3,005,816    Amiard et al. _____ Oct. 24, 1961